(12) United States Patent
Wall

(10) Patent No.: US 10,515,231 B2
(45) Date of Patent: Dec. 24, 2019

(54) METHOD OF OBFUSCATING RELATIONSHIPS BETWEEN DATA IN DATABASE TABLES

(71) Applicant: Symcor Inc., Mississauga (CA)

(72) Inventor: John Wall, Oakville (CA)

(73) Assignee: SYMCOR INC., Mississauga, Ontario (CA)

( * ) Notice: Subject to any disclaimer, the term of this patent is extended or adjusted under 35 U.S.C. 154(b) by 7 days.

(21) Appl. No.: 14/075,676

(22) Filed: Nov. 8, 2013

(65) Prior Publication Data

US 2015/0135327 A1   May 14, 2015

(51) Int. Cl.
  *G06F 21/60* (2013.01)
  *G06F 21/62* (2013.01)

(52) U.S. Cl.
  CPC ...... *G06F 21/6254* (2013.01); *G06F 21/6218* (2013.01); *G06F 21/6227* (2013.01)

(58) Field of Classification Search
  CPC .......... G06F 21/60; G06F 21/6218; G06F 2221/2141; G06F 17/30699; G06F 17/30613; G06F 21/6227; G06F 21/6254; H04L 63/101
  USPC .................................... 726/26; 707/E17.005
  See application file for complete search history.

(56) References Cited

U.S. PATENT DOCUMENTS

| | | | | |
|---|---|---|---|---|
| 4,680,700 A | * | 7/1987 | Hester ................. | G06F 12/1018 711/206 |
| 5,231,577 A | * | 7/1993 | Koss ..................... | G06F 17/246 345/440 |
| 5,555,403 A | * | 9/1996 | Cambot ............ | G06F 17/30398 |
| 5,592,375 A | * | 1/1997 | Salmon .............. | G06Q 10/1053 705/22 |
| 5,706,495 A | * | 1/1998 | Chadha ............. | G06F 17/30324 |
| 5,710,915 A | * | 1/1998 | McElhiney | |
| 5,819,268 A | * | 10/1998 | Hackett ............. | G06F 17/30595 707/690 |
| 5,864,842 A | * | 1/1999 | Pederson .......... | G06F 17/30445 |
| 5,941,947 A | * | 8/1999 | Brown et al. ................. | 709/225 |
| 6,112,209 A | * | 8/2000 | Gusack | |
| 6,122,279 A | * | 9/2000 | Milway ................ | H04L 49/203 370/395.32 |

(Continued)

FOREIGN PATENT DOCUMENTS

EP   0551678 A1 *  7/1993  ........... G07F 7/1016

OTHER PUBLICATIONS

Anonymously Disclosed, IP.com No. 000219767, "Method of upgrade images automatically in a cloud environment", 9 pages ( including cover sheet), Jul. 12, 2012.*

(Continued)

*Primary Examiner* — Luu T Pham
*Assistant Examiner* — Walter J Malinowski

(57) ABSTRACT

Relationships between data in database tables are obfuscated. An input data set is divided into two database tables with corresponding rows. A key field if created in a second one of the tables, and for each row, the field is populated with a value generated with a one-way function, using a unique value associated with the corresponding row of the first one of the tables as an input. The two tables are stored in a data store, so that the data in corresponding rows may be associated only with access to the one way function, and the unique value associated with a row of the first table.

15 Claims, 10 Drawing Sheets

(56) References Cited

U.S. PATENT DOCUMENTS

| | | | | |
|---|---|---|---|---|
| 6,148,382 | A * | 11/2000 | Bitner | G06F 11/1471 711/159 |
| 6,307,936 | B1 * | 10/2001 | Ober | G06F 8/60 380/277 |
| 6,405,210 | B1 * | 6/2002 | Doyle | G06F 9/4428 |
| 6,466,929 | B1 * | 10/2002 | Brown et al. | 706/48 |
| 6,480,858 | B1 * | 11/2002 | Boa | G06F 17/30949 707/713 |
| 6,516,327 | B1 * | 2/2003 | Zondervan | G06F 17/30581 |
| 6,567,408 | B1 * | 5/2003 | Li et al. | 370/395.31 |
| 6,651,222 | B2 * | 11/2003 | Gupta et al. | 716/102 |
| 6,671,407 | B1 * | 12/2003 | Venkatesan et al. | 382/232 |
| 6,687,704 | B1 * | 2/2004 | Russell | G06F 17/30292 |
| 6,704,871 | B1 * | 3/2004 | Kaplan | G06F 21/72 713/192 |
| 6,944,633 | B1 * | 9/2005 | Higa | G06F 17/30498 |
| 6,957,225 | B1 * | 10/2005 | Zait | G06F 17/3033 |
| 7,020,661 | B1 * | 3/2006 | Cruanes | G06F 17/30498 |
| 7,043,487 | B2 * | 5/2006 | Krishnamurthy | G06F 17/30595 707/804 |
| 7,054,852 | B1 * | 5/2006 | Cohen | G06F 17/30595 |
| 7,111,005 | B1 * | 9/2006 | Wessman | |
| 7,272,654 | B1 * | 9/2007 | Brendel | G06F 17/30091 707/999.01 |
| 7,343,363 | B1 * | 3/2008 | Parker | G06N 5/02 706/45 |
| 7,577,637 | B2 * | 8/2009 | Ghosh | |
| 7,668,849 | B1 * | 2/2010 | Narancic | G06F 17/3089 707/811 |
| 7,725,471 | B2 * | 5/2010 | Weinberg | G06F 17/30312 707/740 |
| 7,822,740 | B2 * | 10/2010 | Abdo | 707/714 |
| 7,827,218 | B1 * | 11/2010 | Mittal | G06F 17/30321 370/389 |
| 7,899,796 | B1 * | 3/2011 | Borthwick | G06F 17/30489 707/692 |
| 7,965,843 | B1 * | 6/2011 | Maino | H04L 63/12 380/256 |
| 8,006,280 | B1 * | 8/2011 | Hildebrand | G06F 21/6218 380/277 |
| 8,331,566 | B1 * | 12/2012 | Foote et al. | 380/255 |
| 8,386,445 | B2 * | 2/2013 | Egan et al. | 707/694 |
| 8,407,531 | B2 * | 3/2013 | Tran | G06F 9/524 708/104 |
| 8,412,755 | B2 * | 4/2013 | Stephenson et al. | 707/899 |
| 8,522,349 | B2 * | 8/2013 | Crume | H04L 63/1441 705/51 |
| 8,626,524 | B1 * | 1/2014 | Koehl | H04L 51/08 705/2 |
| 8,666,900 | B1 * | 3/2014 | Chan et al. | 705/59 |
| 8,695,106 | B2 * | 4/2014 | Spalka | G06F 21/6254 713/189 |
| 8,774,527 | B1 * | 7/2014 | Anguelov | G06K 9/00704 340/539.13 |
| 9,002,887 | B1 * | 4/2015 | Herrmann et al. | 707/776 |
| 2002/0038301 | A1 * | 3/2002 | Aridor et al. | 707/10 |
| 2002/0062258 | A1 * | 5/2002 | Bailey | G06F 17/30398 705/26.1 |
| 2002/0078331 | A1 * | 6/2002 | Ju et al. | 712/240 |
| 2002/0111997 | A1 * | 8/2002 | Herlihy | 709/203 |
| 2002/0178171 | A1 * | 11/2002 | Walker | G06F 17/30595 |
| 2002/0194472 | A1 * | 12/2002 | Lawson | 713/163 |
| 2003/0081615 | A1 * | 5/2003 | Kohn | G06F 1/3203 370/395.42 |
| 2003/0154197 | A1 * | 8/2003 | Millet et al. | 707/9 |
| 2004/0078568 | A1 * | 4/2004 | Pham et al. | 713/165 |
| 2004/0091111 | A1 * | 5/2004 | Levy | H04N 1/00323 380/202 |
| 2004/0117653 | A1 * | 6/2004 | Shapira | H04L 63/0485 726/15 |
| 2004/0148290 | A1 * | 7/2004 | Merenda | A01H 5/02 |
| 2004/0160954 | A1 * | 8/2004 | Shimizu | H04L 45/745 370/389 |
| 2004/0225673 | A1 * | 11/2004 | Beck | G06F 17/30598 |
| 2005/0050023 | A1 * | 3/2005 | Gosse | G06F 17/30864 |
| 2005/0055369 | A1 * | 3/2005 | Gorelik | G06F 17/30292 |
| 2005/0069131 | A1 * | 3/2005 | de Jong | 380/239 |
| 2005/0071652 | A1 * | 3/2005 | de Jong | G06F 21/10 713/189 |
| 2005/0131649 | A1 * | 6/2005 | Larsen | G06F 19/28 702/19 |
| 2005/0169480 | A1 * | 8/2005 | Kuehn et al. | 380/277 |
| 2005/0174272 | A1 * | 8/2005 | Cadambi | G06F 17/30949 341/106 |
| 2005/0251524 | A1 * | 11/2005 | Shukla | G06F 17/30321 |
| 2006/0026174 | A1 * | 2/2006 | Lundberg | G06F 17/30684 |
| 2006/0039313 | A1 * | 2/2006 | Chou | H04L 12/5695 370/328 |
| 2006/0095447 | A1 * | 5/2006 | Dickinson et al. | 707/100 |
| 2006/0156278 | A1 * | 7/2006 | Reager | 717/104 |
| 2006/0179075 | A1 * | 8/2006 | Fay | G06F 21/6245 |
| 2006/0277178 | A1 * | 12/2006 | Wang | G06F 17/30306 |
| 2007/0038863 | A1 * | 2/2007 | Nguyen | G06F 21/6254 713/176 |
| 2007/0083763 | A1 * | 4/2007 | Itoh | H04L 9/3247 713/176 |
| 2007/0250717 | A1 * | 10/2007 | Kumagai et al. | 713/176 |
| 2008/0189558 | A1 * | 8/2008 | Hughes | G06F 21/80 713/193 |
| 2008/0235231 | A1 * | 9/2008 | Gass | G06F 21/6227 |
| 2009/0024852 | A1 * | 1/2009 | Yonezawa | H04L 9/3013 713/180 |
| 2009/0055418 | A1 * | 2/2009 | Megerian | G06F 17/3051 |
| 2009/0185677 | A1 * | 7/2009 | Bugbee | H04L 9/0841 380/28 |
| 2009/0226872 | A1 * | 9/2009 | Gunther | G09B 7/00 434/350 |
| 2009/0248616 | A1 * | 10/2009 | Molini | G06F 17/30336 |
| 2009/0307240 | A1 * | 12/2009 | Basile | G06Q 20/383 |
| 2009/0320035 | A1 * | 12/2009 | Ahlgren | G06F 9/468 718/104 |
| 2009/0328218 | A1 * | 12/2009 | Tsurukawa | G06F 21/64 726/23 |
| 2010/0005054 | A1 * | 1/2010 | Smith | G06F 16/2456 707/E17.002 |
| 2010/0010960 | A1 * | 1/2010 | Singh | 707/2 |
| 2010/0082648 | A1 * | 4/2010 | Potapov | G06F 3/0611 707/756 |
| 2010/0131484 | A1 * | 5/2010 | Gosse | G06F 17/30864 707/706 |
| 2010/0131518 | A1 * | 5/2010 | Elteto et al. | 707/752 |
| 2010/0162388 | A1 * | 6/2010 | Baugher | G06F 21/6245 726/19 |
| 2010/0211573 | A1 * | 8/2010 | Sekiguchi | G06F 17/30336 707/747 |
| 2010/0211967 | A1 | 8/2010 | Ramaswamy et al. | |
| 2010/0257354 | A1 * | 10/2010 | Johnston et al. | 713/153 |
| 2010/0306854 | A1 * | 12/2010 | Neergaard | G06F 21/6254 726/26 |
| 2010/0332652 | A1 * | 12/2010 | Bhattacharya | H04L 41/069 709/224 |
| 2011/0031309 | A1 | 2/2011 | Duhaime et al. | |
| 2011/0099503 | A1 * | 4/2011 | Golani et al. | 715/772 |
| 2011/0125709 | A1 * | 5/2011 | Pandya | G06F 17/30575 707/610 |
| 2011/0179011 | A1 * | 7/2011 | Cardno | G06F 21/6227 707/709 |
| 2011/0285971 | A1 * | 11/2011 | Oka | 353/70 |
| 2011/0296192 | A1 * | 12/2011 | Hayashi et al. | 713/180 |
| 2011/0320408 | A1 * | 12/2011 | Grosse | G06F 16/958 707/661 |
| 2012/0011512 | A1 * | 1/2012 | Peckham | G06F 9/44521 718/100 |
| 2012/0072992 | A1 * | 3/2012 | Arasaratnam et al. | 726/26 |
| 2012/0136904 | A1 * | 5/2012 | Venkata Naga Ravi | 707/803 |
| 2012/0246206 | A1 * | 9/2012 | Yamada | H04L 67/1095 707/827 |
| 2013/0080416 | A1 * | 3/2013 | Meade | 707/713 |

(56) References Cited

U.S. PATENT DOCUMENTS

| | | | | |
|---|---|---|---|---|
| 2013/0086073 | A1* | 4/2013 | Lyle | G06F 17/3033 707/747 |
| 2013/0110883 | A1* | 5/2013 | Junqueira | G06F 17/30353 707/803 |
| 2013/0159353 | A1* | 6/2013 | Fuh | G06F 11/3672 707/803 |
| 2013/0204996 | A1* | 8/2013 | Takazawa | H04L 41/08 709/223 |
| 2013/0212704 | A1* | 8/2013 | Shablygin | G06F 21/6218 726/28 |
| 2013/0275973 | A1* | 10/2013 | Greenfield | G06F 9/44584 718/1 |
| 2013/0311518 | A1* | 11/2013 | Agbaria | G06F 17/30377 707/803 |
| 2013/0339399 | A1* | 12/2013 | Dorris et al. | 707/803 |
| 2014/0006342 | A1* | 1/2014 | Love | G06F 17/30345 707/609 |
| 2014/0032928 | A1* | 1/2014 | Taskaya | H04L 63/0428 713/189 |
| 2014/0095475 | A1* | 4/2014 | Su | G06F 17/30466 707/718 |
| 2014/0101458 | A1* | 4/2014 | Farrugia | G06F 21/125 713/190 |
| 2014/0114968 | A1* | 4/2014 | Anderson | G06F 17/30 707/732 |
| 2014/0137262 | A1* | 5/2014 | Stofberg | G06F 21/6254 726/26 |
| 2014/0188893 | A1* | 7/2014 | Kobayashi | G06F 17/3033 707/747 |
| 2014/0237609 | A1* | 8/2014 | Sharp | G06F 21/53 726/26 |
| 2014/0244960 | A1* | 8/2014 | Ise | G06F 3/061 711/165 |
| 2015/0082033 | A1* | 3/2015 | Bruce | G06F 9/54 713/168 |
| 2015/0082441 | A1* | 3/2015 | Gathala et al. | 726/25 |
| 2017/0206552 | A1* | 7/2017 | Rajkumar | G06Q 30/0255 |

OTHER PUBLICATIONS

Kromberg, "Arrays of Objects", DLS'07, Oct. 22, 2007, Canada, ACM, pp. 20-28.*
Ranjan, "Peer-to-Peer-Based Resource Discovery in Global Grids: A Tutorial", IEEE Communications Surveys, $2^{nd}$ Quarter 2008, vol. 10, No. 2, pp. 6-33.*
"What is hashing? Definition from Whatis.com", Sep. 15, 2005, 5 pages.*
"PCI Data Storage Do's and Don'ts", PCI Security Standards Council, Nov. 4, 2008, 2 pages.*
Copeland, "Hash Index for Locating Tuples in a Distributed or Parallel Database", IBM Technical Disclosure Bulletin, vol. 36, No. 5, May 1993, pp. 259-262.*
Brewer, "Combining Systems and Databases: A Search Engine Retrospective", In Readings in Database Systems, Fourth Edition (2005), pp. 711-724.*
Auradkar, "Data Infrastructure at LinkedIn", 2012 IEEE 28th International Conference on Data Engineering, 2012, pp. 1370-1381.*
Jain, Rohit, and Sunil Prabhakar. "Trustworthy data from untrusted databases." In Data Engineering (ICDE), 2013 IEEE 29th International Conference on, pp. 529-540. IEEE, 2013. (Year: 2013).*
Schnell, Rainer, Tobias Bachteler, and Jörg Reiher. "Privacy-preserving record linkage using Bloom filters." BMC medical informatics and decision making 9, No. 1 (2009): 41. (Year: 2009).*
Agrawal, Rakesh, Paul Bird, Tyrone Grandison, Jerry Kiernan, Scott Logan, and Walid Rjaibi. "Extending relational database systems to automatically enforce privacy policies." In Data Engineering, 2005. ICDE 2005. Proceedings. 21st International Conference on, pp. 1013-1022. IEEE, 2005. (Year: 2005).*
Zhang, Zhen, Seung-won Hwang, Kevin Chen-Chuan, Chang, Min Wang, Christian A. Lang, and Yuan-chi Chang. "Boolean+ ranking: querying a database by k-constrained optimization." In Proceedings of the 2006 ACM SIGMOD international conference on Management of data, pp. 359-370. ACM, 2006. (Year: 2006).*
Corcoglioniti, Francesco, Marco Rospocher, Roldano Cattoni, Bernardo Magnini, and Luciano Serafini. "Interlinking unstructured and structured knowledge in an integrated framework." In 2013 IEEE Seventh International Conference on Semantic Computing, pp. 40-47. IEEE, 2013. (Year: 2013).*
Chisvin, Lawrence, and R. James Duckworth. "Content-addressable and associative memory: Alternatives to the ubiquitous RAM." Computer 22, No. 7 (1989): 51-64. (Year: 1989).*
Fox, Anthony, Chris Eichelberger, James Hughes, and Skylar Lyon. "Spatio-temporal indexing in non-relational distributed databases." In 2013 IEEE International Conference on Big Data, pp. 291-299. IEEE, 2013. (Year: 2013).*
Freeman, Michael, and Jim Austin. "Designing a binary neural network co-processor." In 8th Euromicro Conference on Digital System Design (DSD'05), pp. 223-226. IEEE, 2005. (Year: 2005).*
Shelake, Vijay Maruti, and Narendra Shekokar. "A survey of privacy preserving data integration." In 2017 International Conference on Electrical, Electronics, Communication, Computer, and Optimization Techniques (ICEECCOT), pp. 59-70. IEEE, Year: (2017).*
Aggarwal et al., "Two can keep a secret: a distributed architecture for secure database services", Proceedings of the 2005 CIDR Conference.
SQLAlchemy 0.8 Documentation, Relationship Configuration, retrieved from http://docs.sqlalchemy.org/en/latest/orm/relationships.html on Jun. 7, 2012.

\* cited by examiner

Statement

44 → Mr. John Doe          Balance: $2,000 ← 48
46 → Credit card number: 12345678    Payment due: March 10, 2013 ← 50
                                                              ← 52

| Transactions this month | |
|---|---|
| Transaction 1 | Value |
| Transaction 2 | Value |
| Transaction 3 | Value |
| Transaction 4 | Value |

FIG. 5A

| STMT_ID | ORIG_IMAGE | ~54 |
|---|---|---|
| 000001 | img.0001.tif | ~58 |
| 000002 | img.0002.tif | |

METHOD OF OBFUSCATING RELATIONSHIPS BETWEEN DATA IN DATABASE TABLES

FIELD

The present invention relates to methods, devices and software for storing relational data, and particularly to obfuscating relationships between data in relational databases.

BACKGROUND

Large databases often include data of many different types, and may include personal data. Unauthorized access to personal data may constitute a breach of privacy or a security risk. Some types of personal data may be more sensitive than others in that unauthorized access represents a more significant privacy breach or security risk.

Accordingly, maintainers of databases may divide database contents to segregate sensitive data into multiple subsets, conventionally, all subsets are provided with a common key field, allowing the subsets to be joined. However, such security measures are imperfect, as the subsets may be easily reconstructed. Additional protection may therefore be provided for sensitive data. For database contents may be encrypted. Unfortunately, such protection may be costly and/or inefficient. For example, encryption imposes significant computational overhead, and may impede efficient database operations, including search and retrieval operations.

Accordingly, new methods, software and devices for storing relational data are desired.

SUMMARY

According to aspects of the present disclosure, relationships between data in database tables are obfuscated. An input data set is divided into two database tables with corresponding rows. A key field if created in a second one of the tables, and for each row, the field is populated with a valve generated with a one-way function, using a unique valve associated with the corresponding row of the first one of the tables as an input. The two tables are stored in a data store, so that the data in corresponding rows may be associated only with access to the one way function, and the unique valve associated with a row of the first table.

In an aspect, there is provided a method of obfuscating a relationship between data in database tables, the method comprising: dividing an input data set into first and second tables of a database, wherein each row of the second table corresponds to a row of the first table; creating a key field in said second table; for each row of the second table, populating the key field with a value generated by a one-way function, wherein a unique value associated with the corresponding row in the first table is used as an input to the one-way function; storing the first and second tables in a data store.

In another aspect, there is provided a method of retrieving data stored in database tables, the method comprising: retrieving a first database table from a data store; selecting a row of the first database table; determining an encoded identifier corresponding to the selected row by applying a one-way function to a unique value associated with the selected row; retrieving a corresponding row of a second database table from a data store, wherein the corresponding row contains the encoded identifier; and combining data from the selected row of the first database table with data from the corresponding row of the second database table.

In another aspect, a computing device for storing information in a database comprises: at least one processor; an input/output device in communication with the at least one processor; memory in communication with the at least one processor; software code stored in the memory, which, when executed by the at least one processor, causes the computing device to: read an input data set from the input/output device; divide the input data set into first and second tables of a database, wherein each row of the second table corresponds to a row of the first table; create a key field in the second table; for each row of the second table, populate the key field with a value generated by a one way function, wherein a unique value associated with the corresponding row of the first table is used as an input to the one-way function; store the first and second database tables in an interconnected data store.

In another aspect, a computing device for storing information in a database comprises: at least one processor; an input/output device in communication with the at least one processor; memory in communication with the at least one processor; software code stored in the memory, which, when executed by the at least one processor, causes the computing device to: retrieve a first database table from a data store using the input/output device; select a row of the first database table; apply a one-way function to a unique value associated with the selected row to determine an encoded identifier corresponding to the selected row; retrieve a corresponding row of a second database table from the data store, wherein the corresponding row contains the encoded identifier; combine data from the selected row of the first database table with data from the corresponding row of the second database table.

BRIEF DESCRIPTION OF THE DRAWINGS

In the figures, which illustrate by way of example only, embodiments of this invention:

FIG. 5A is a schematic diagram illustrating a statement image of a data set input to the database server of FIG. 1;

FIG. 5B is a schematic diagram illustrating a database table of the data set input to the database server of FIG. 1;

DETAILED DESCRIPTION

Figure 1:
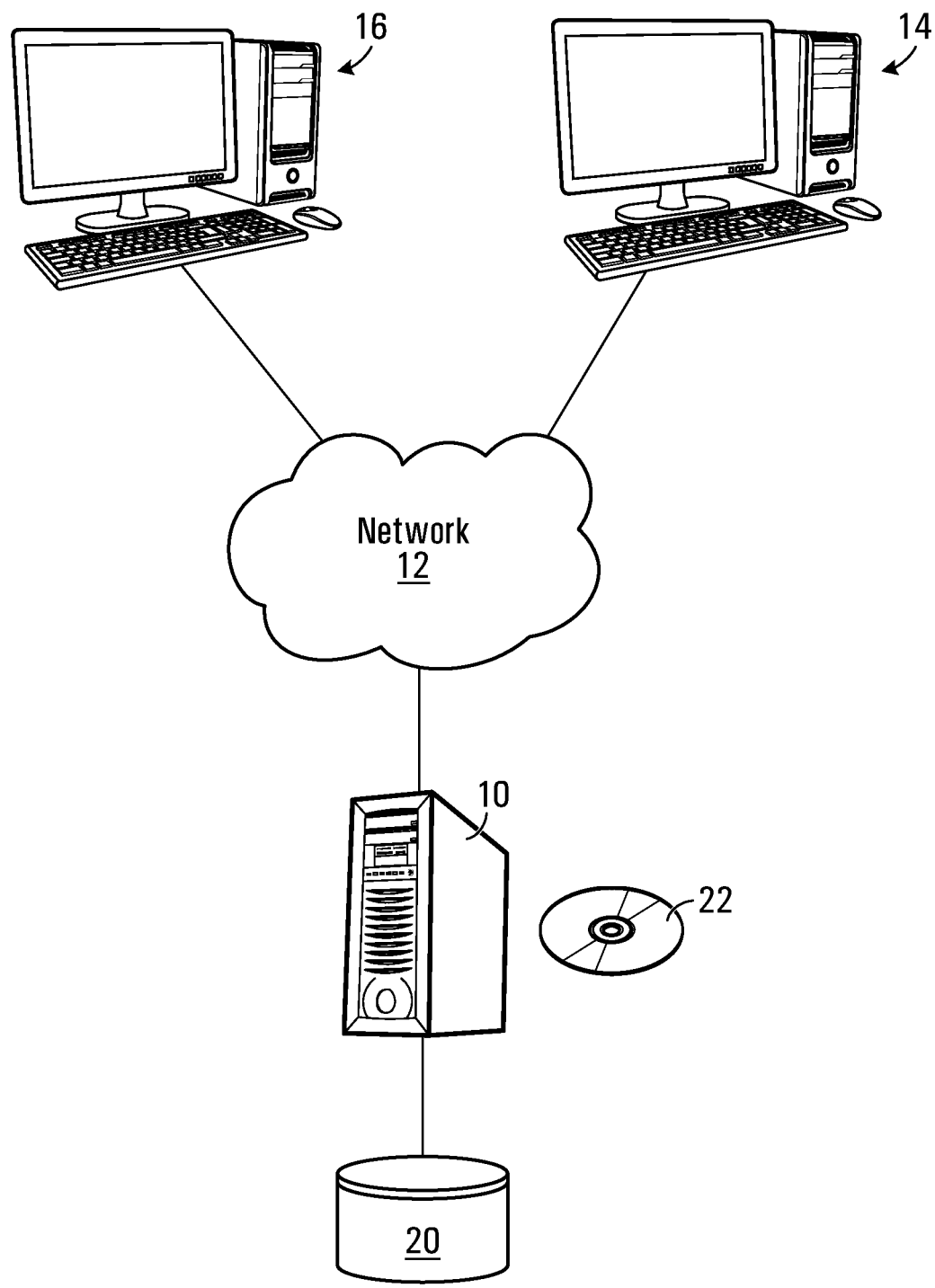
FIG. 1 is a schematic block diagram of a computer network, database server and client computers, operable to store data in and retrieve data from a relational database.

FIG. 1 depicts a computer system including a database 20 at a database server 10. Database server 10 may be a conventional network server that is connected to a computer network 12 and is operable under the control of software loaded from a computer-readable medium 22 to store data in database 20. Network 12 may be the public internet, or may be a private local packet switched data network. Network 12 could, for example, be an IPv4, IPv6, X.25, IPX compliant or similar network. Network 12 may include wired and wireless points of access, including wireless access points, and brides to other communications networks, such as GSM/GPRS/3G or similar wireless networks.

Example client computers 14, 16 are also illustrated. Client computers 14, 16 are conventional network-interconnected computing devices connected to network 12 and may be used to send data to database server 10 for storage and to retrieve and display data received from database server 10. The architecture of client computers 12, 14 is not specifically illustrated. Each client computer may include a processor, network interface, display and memory and may be a desktop personal computer, a laptop computing device, a network computing device, a tablet computing device or the like.

Database server 10 executes software loaded from computer-readable medium 22. Database server 10 hosts a relational information base in database 20. As is further described below, database server 10 may receive an input data set 24 to be stored in database 20 for later access by client computers 14, 16. Data set 24 may be received, for example over a network connection or from computer-readable storage media such as hard drives, DVDs or the like.

Figure 2:
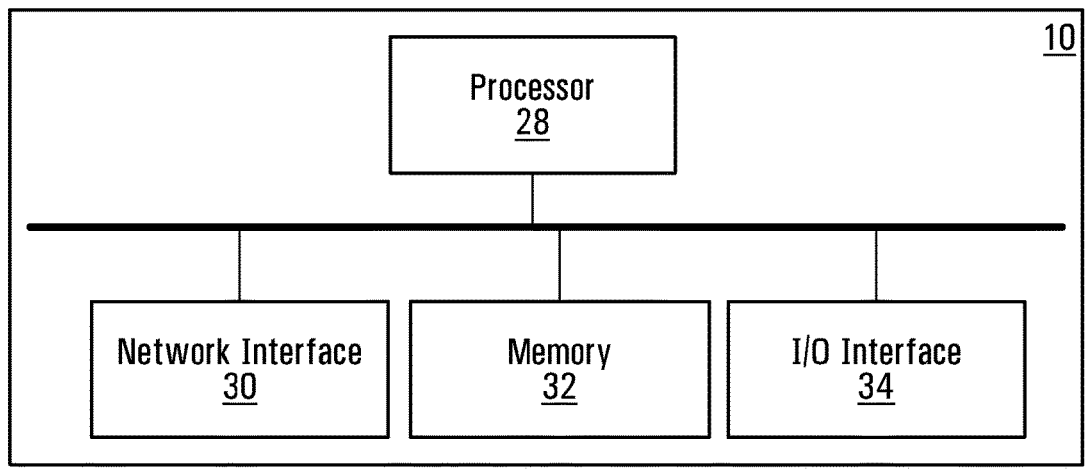
FIG. 2 is a schematic block diagram of the database server of FIG. 1.

FIG. 2 is a block diagram of hardware components of database server 10. As illustrated, server 10 includes processor 28, network interface 30, a suitable combination of persistent storage memory 32, random access memory and read only memory and one or more I/O interfaces 34. Processor 28 may be an Intel x86, PowerPC, ARM processor or the like. Network interface 30 interconnects server 10 to network 12. Memory 32 may be organized using a conventional filesystem. Server 10 may include input and output peripherals interconnected to server 10 by one or more I/O interfaces 34. These peripherals may include a keyboard, display, mouse and one or more devices such as DVD drives, USB ports and the like for reading computer-readable storage media, to load software components exemplary of embodiments of the present invention into memory 32. Exemplary of embodiments, these software components, when executed, adapt server 10 receive an input data set and obfuscate relationships between data in the data set, as detailed below.

Figure 3:
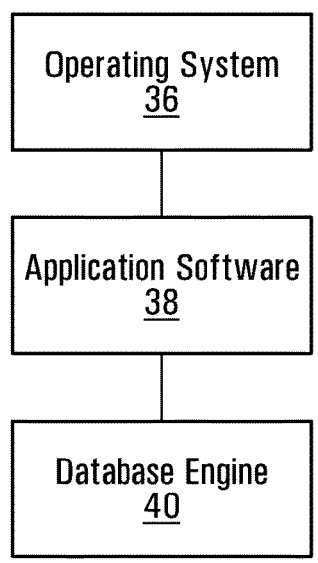
FIG. 3 is a functional block diagram of software stored and executing at the database server of FIG. 1.

FIG. 3 illustrates a simplified organization of example software components stored at server 10 for execution by the server. As illustrated, software components include an operating system (O/S) 36, application software 38 and a database engine 40.

O/S 36 controls overall operation of server 10 and controls and administers a filesystem maintained in memory 32. O/S 36 may, for example, be a UNIX-based operating system (e.g., Linux, FreeBSD, Solaris, OSX, etc.), a Microsoft Windows operating system, or the like. O/S 36 allows other software components to access processor 28, network interface 30, memory 32, and one or more I/O interfaces 34 of server 10. O/S software 36 may include a TCP/IP stack allowing server 10 to communicate with other computing devices, such as client computers 14, 16 through network interface 30 using the TCP/IP protocol.

Database engine 40 operates within operating system 36 to store and retrieve data from database 20. Database engine 40 may be a conventional relational database engine, such as Microsoft SQL server, Oracle, DB2, Sybase, Pervasive or any other database engine known to those of ordinary skill in the art. Database engine 40 includes an interface for interaction with application software 38.

Application software 38 allows users to interact with database 20 to access and store obfuscated relational data in database 20, as described herein. To that end, application software 38 provides a user interface allowing a user to input instructions. Software running at server 10 may also include software components to provide users of other interconnected computing devices, e.g. client computers 14, 16, with access to the functions of application software 38, and therefore, database engine 40. For example, server 10 may operate an HTTP server application to provide HTTP pages of a web site for access by client computers 14, 16. Such HTTP pages may be written using (X)HTML, Java, Javascript, Ruby, Python, Perl, PHP, Flash or the like.

Figure 4:
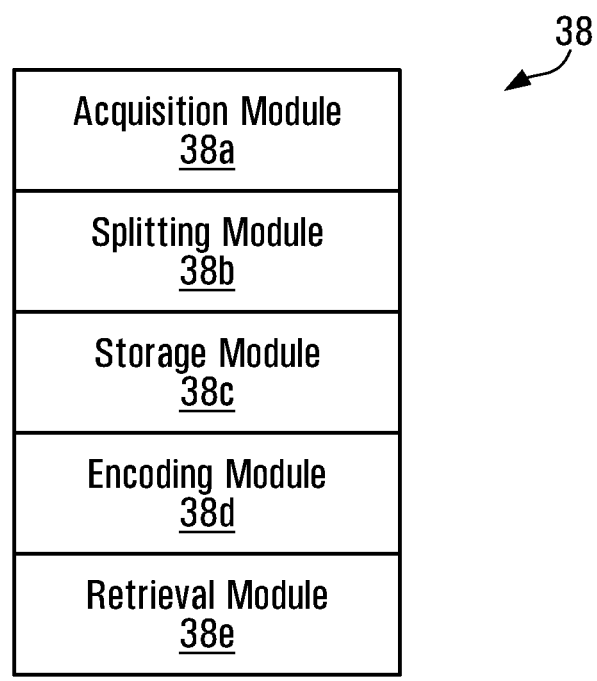
FIG. 4 is a functional block diagram illustrating modules of application software stored at the database server of FIG. 1.

Application software 38 running at server 10 may include a plurality of components as depicted in FIG. 4. Collectively, the components of application software 38 allow relational data to be stored in a way that obfuscates relationships between stored data. Specifically, the components of application software 38 allow input data to be partitioned and portions of input data to be distributed across multiple tables of database 20, with an encoded identifier allowing corresponding portions to be matched and re-assembled only by obtaining the encoded identifier. As is described in more detail below, a set of input images 42 (FIG. 6) may, for example, be partitioned into multiple portions 60, 62. The portions may be stored in two separate tables 68, 70 (FIG. 7) of database 20. Each row of table 68 has a unique identifier associated therewith. An encoding function 72 may be used to generate a corresponding unique encoded identifier. As will become apparent, a one-way relationship is therefore defined between tables 68 and 70. The corresponding rows of the two tables, and therefore, the corresponding portions of an input image may be recombined by applying the encoding function to the unique identifier associated with the relevant row of table 68 to determine the corresponding encoded identifier, and thus, the corresponding row of table 70. However, an encoded identifier in table 70 cannot be used to identify the corresponding row of table 68.

To that end application software 38 may include data/image acquisition module 38a which interfaces with a storage device, peripheral or another computer interconnected to server 10 to acquire an input data set 24 to be stored in database 20. Data/image acquisition module 38a presents a user interface at server 10 and, acquires data set 24, for example, from a storage medium into memory on server 10. The storage medium may be a form of removable storage, such as a compact disk, flash storage or the like, which is locally accessible by server 10, or it may be a storage medium connected to another computer and accessible by server 10 over network 12.

Acquisition module 38a may provide a user with the ability to locate the data set 24, for example, by browsing a directory structure. Alternatively, on prompting by a user, acquisition module 38*a* may retrieve the data set from a predetermined location. In some embodiments, data set 24 may be retrieved from another computer over network 12, e.g., over an encrypted connection, acquisition module 38*a* may send a predetermined message to the remote computer, which may cause the remote computer to send data set 24 to the server 10. In other embodiments, the transfer of data set 24 may be initiated by another computer. For example, another computer may send data set 24 over an encrypted connection on network 12. In such embodiments, acquisition module 38*a* may receive the data set 24.

On receipt of data set 24 by server 10, acquisition module 38*a* may cause server 10 to load data set 24 into memory for subsequent operations by other modules of application software 38.

Data set 24 includes one or more images. In an exemplary embodiment, the images may include financial information. The contents of the images are in a particular predetermined format.

For example, data set 24 may include a plurality images of credit card statements such as statement image 42 depicted in FIGS. 5A and 5B. Statement images 42 may contain, for example, a customer name 44, credit card number 46, balance 48, payment due date 50 and one or more transaction records 52. Each of these pieces of information is located at a specific, predetermined location of the statement image.

The format of statement images 42 is known to application software 38. Specifically, splitting module 38*b* is loaded with templates describing possible formats of images in input data set 24. Each template defines a pattern according to which a particular format of image is to be partitioned. Thus, for a given image format, splitting module 38*b* is loaded with a template which defines image portions which will be stored separately from one another in different tables of database 20. Splitting module 38*b* may determine the correct template, for example, based on meta-data associated with the statement images 42, based on the source from which the data set 24 is acquired.

On receipt and loading into memory of data set 24, splitting module 38*b* determines the format of the images and loads the relevant template. As will be described in further detail below, application software 38 successively processes each image for storage. As part of such processing, according to the relevant template, splitting module 38*b* creates copies of at least two image portions corresponding to the partitioning pattern defined by the template.

Along with statement images 42, data set 24 may include data associated with the images. The associated data may take the form of meta-data in the image files themselves, or it may take the form of separate field-delimited data in a format known to splitting module 38*b*. For example, the associated data may comprise a series of delimited values corresponding to the contents of the images 42.

Splitting module 38*a* may interpret field-delimited associated data as rows of a table like table 54 depicted in FIG. 5B. The associated data may, for example, include a statement number values associated with individual statement images for populating a "STMT_ID" field of a database table, and identifiers (for example, filenames) of the corresponding statement images 42 for populating an "ORIGINAL_IMG" field.

Where data set 24 includes data associated with images 42, the pre-defined templates of splitting module 38*b* define how data fields are to be distributed across tables of database 20, and therefore, how the associated data is to be stored Based on the pre-defined template, and the fields to which the values of the associated data belong, the splitting module identifies the table of database 20 to which each value of the associated data is to be written.

Application software 38 also includes a storage module 38*c*. Storage module 38*c* receives the image portions and, if applicable, meta-data portions created by splitting module 38*b*, and stores the portions in appropriate tables of database 20. Portions of meta-data may correspond to portions of images. That is, for a particular statement image, the splitting module may partition the image to create an image portion with an image of a credit card number. The credit card number may also be defined in meta-data, and the splitting module may partition the meta-data to create a corresponding meta-data portion with the credit card number.

Each of the created image portions is stored in a new row of a corresponding table of database 20. For example, where each statement image 42 of data set 24 is partitioned into two portions by the splitting module, the first portion of each image is stored in a new row of a first table, and the second portion of each image is stored in a new row of a second table. Accordingly, storage module 38*c* creates new rows in the appropriate tables and executes commands to store the image portions in the created rows. If an image portion has a corresponding meta-data portion, the data of the meta-data portion may be stored as an entry in the row that contains the image portion.

For each statement image, storage module 38*c* creates new rows and stores image portions in at least first and second tables of database 20 (corresponding to the at least two image portions created by splitting module 38*b*). The second table contains a field for a key linking each row of the second table to a corresponding row of the first table.

An encoding module 38*d* assigns a coded key value to the key field in each row of the second table. The encoding module generates each key value using a seeded, deterministic one-way function, such as an SHA1 hash function. Specifically, to generate a key value for a row of the second table, the encoding module loads the one-way function and reads and loads a unique value associated with the corresponding row of the first table. The encoding module then applies the one-way function to the unique value, resulting in an encoded key, which is written to the second table. A salt may be used as an additional input to the one-way function. The salt may be, for example, a secret token code issued to an authorized user or workstation. In some embodiments, the salt may be stored in a secure location, such as a keystore, which may be logically and physically separated from database 20.

Once image portions are stored, a user may wish to access and re-associate the image portions, either from server 10 or from an interconnected client computer 14, 16. To this end, application software 38 includes a retrieval module 38*e*. Retrieval module may receive a request from a client computer for information in database 20. For example, a client computer may pass to server 10 a request for an image of a specific credit card statement which is stored in portions in separate tables. Accordingly, on receiving a request, retrieval module 38*e* may retrieve and load into memory the relevant row of a first database table. The retrieval module 38*e* also loads into memory the one-way function used by encoding module 38*d*. Retrieval module 38*e* also obtains from the client computer the salt used as a key for the one-way function. The salt may be obtained at the client computer prior to the client computer sending a request to the server 10, or the retrieval 38 may request the salt in response to receiving a request.

Once the salt is received by the retrieval module 38e, the retrieval module uses the one-way function with the salt and the unique identifying value associated with the loaded row of the first table to calculate the corresponding encoded key. Using the calculated encoded key, the retrieval module then formulates a query to retrieve from database 20 the corresponding row of the second table.

Once the corresponding row of the second table has been retrieved, the image portions stored in the selected rows of the first and second tables are joined and are returned to the client computer.

An authorized user with access to the appropriate salt can thus cause the retrieval module 38e to retrieve corresponding rows of different tables of database 20 and join the rows. Thus, an authorized user may cause the retrieval module to rejoin image portions created by the splitting module 38b.

Conveniently, software 38 allows a maintainer of database 20 to protect against unauthorized access to sensitive data. At the same time, the maintainer may provide easy access to subsets of data in order to allow easy processing.

For example, of the data in data set 24, some data may be highly sensitive, and other data may be less sensitive. That is, some data may represent a serious threat to privacy or security in the sense that unauthorized access to the data would constitute a serious privacy breach or security risk, while other data may be a less serious threat in that unauthorized access would represent only a minor privacy breach or security risk. Moreover, certain combinations or sets of data may be highly sensitive, while the individual components of the set are not particularly sensitive if not combined. For example, unauthorized access to a credit card number, along with the accompanying customer name or monthly statement, may constitute a significant privacy or security breach. However, unauthorized access to a credit card number alone or a statement alone may not constitute a significant breach. At the same time, for some customer service purposes, such as responding to inquiries related to statements, access to the name and credit card number may not be required.

Figure 6:
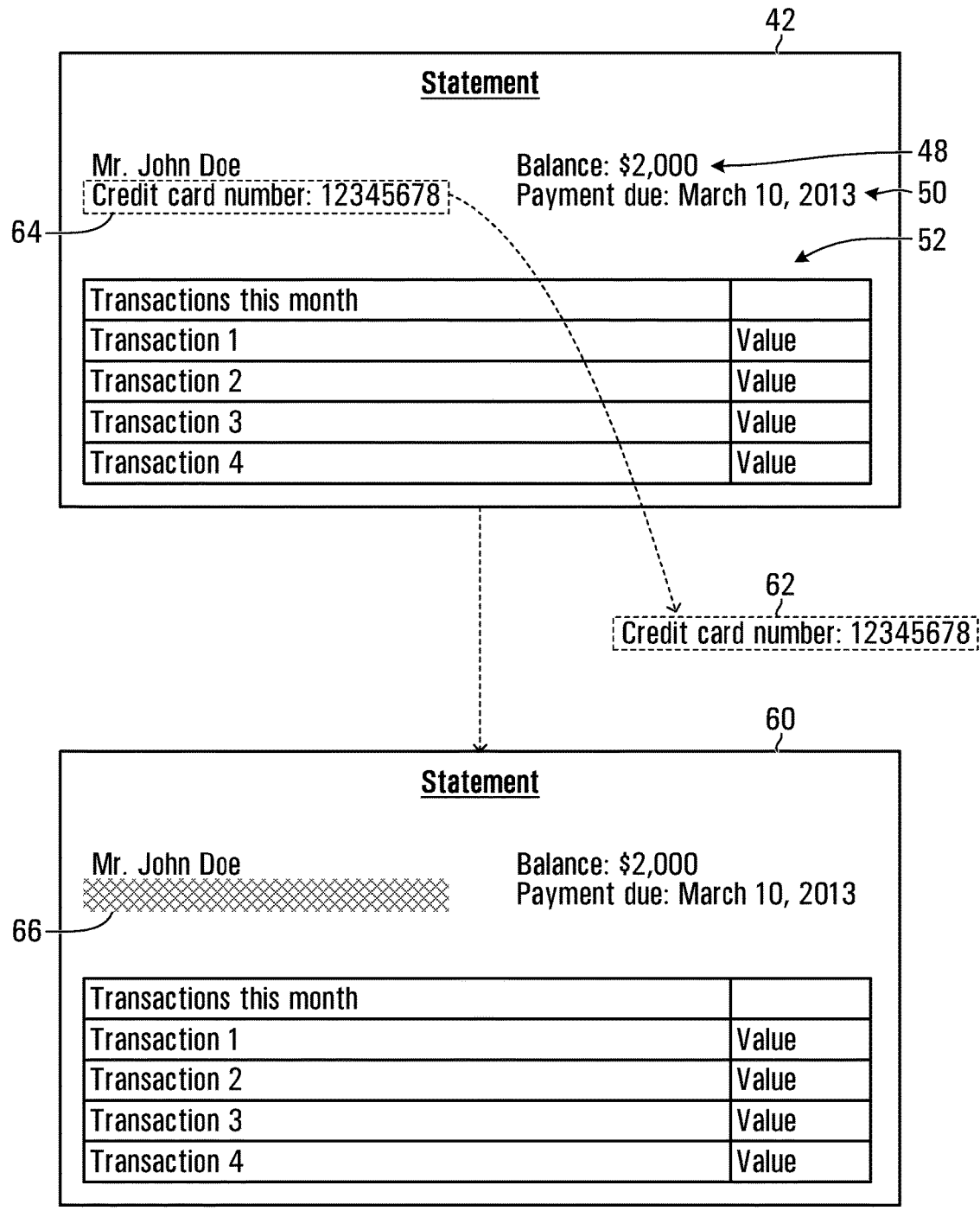
FIG. 6 is a schematic diagram illustrating a filtered image and an image snippet stored in a database at the database server of FIG. 1.

Therefore, as is shown in FIG. 6, to protect sensitive data, each statement image 42 of input data set 24 may be split into a filtered image 60 and an image snippet 62 to be stored in database 20 by software 38. Specifically, region 64 of statement image 42, which contains sensitive data, namely, the credit card number to which the statement pertains, is copied to form an image snippet 62. One or more splitting templates may be associated with database 20, defining how the data of input data set 24 should be divided. For example, a splitting template may define the region of a statement image 42 from which image snippet 62 should be formed, and how fields of database table 54 should be stored.

A filtered image 60 is then formed by copying image statement 42 and rendering region 66, corresponding image snippet 62, unreadable. Region 66 may be rendered unreadable, for example, by inserting random data into region 66. After filtered image 60 and image snippet 62 are created, the input statement image 42 may be deleted.

Filtered images 60 and image snippets 62 are stored in database 20 in association with a filtered image table 68 and an image snippet table 70. Filtered image table 68 and image snippet table 70 serve as indices of filtered images 60 and image snippets 62 and identify correspondence between particular filtered images 60 and the matching image snippets 62.

Figure 7:
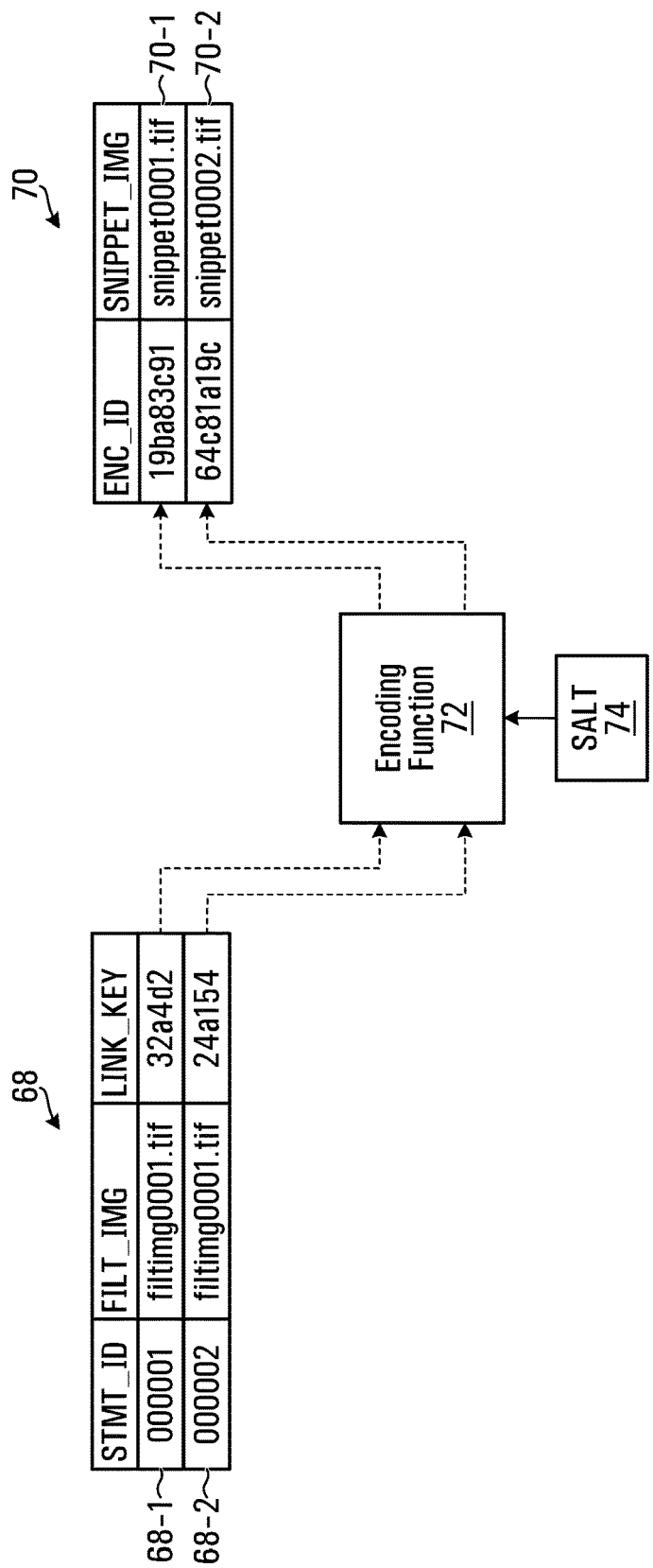
FIG. 7 is a schematic diagram illustrating database tables stored in the database at the database server of FIG. 1.

As depicted in FIG. 7, filtered image table 68 includes three fields, STMT_ID, FILT_IMG, and LINK_KEY. The STMT_ID field holds statement numbers. The FILT_IMG field contains filtered images 60. The LINK_KEY field of table 68 holds a unique value associated with each row of table 68. Values of LINK_KEY may be sequentially assigned, or may be assigned in any other appropriate manner known to those skilled in the art.

Image snippet table 70 has two fields, ENC_ID and SNIPPET_IMG. The SNIPPET_IMG field contains image snippets 62. The ENC_ID field contains a unique value associated with row of the image snippet table 70, and therefore, with each image snippet.

Each row of table 68 corresponds to a row of table 70. That is, each row of table 68 contains a filtered image, while the corresponding row of table 70 contains the matching image snippet. As depicted, table 68 has two rows, 68-1, 68-2 and table 70 has rows 70-1, 70-2, respectively. Row 68-1 corresponds to row 70-1 and row 68-2 corresponds to row 70-2. That is, the filtered image contained in row 68-1 and the image snippet contained in row 70-1 together contain all of the data in a statement image 42, as do the filtered image of row 68-2 and the image snippet of row 70-2. Thus each image statement 42 is split between tables 68 and 70, as is the entirety of data set 24.

To identify the correspondence between rows of tables 68 and 70, the ENC_ID field is of table 70 is populated with values which correspond to values of the LINK_KEY field. Specifically, for each row of table 70, the ENC_ID field is populated by applying an encoding function 72 to the LINK_KEY value from the corresponding row of table 68. The ENC_ID value of row 70-1 is generated by applying encoding function 72 to the LINK_KEY value of row 68-1. Similarly, the ENC_ID value of row 70-2 is generated by applying one-way encoding function 72 to the LINK_KEY value of row 68-2.

Encoding function 72 is an appropriately seeded, deterministic, non-colliding one-way function, such as a SHA1 hash function. Applying encoding function 72 to a LINK-KEY value of table 68 results in a unique value which is stored in the ENC_ID field of the corresponding row of table 70. A salt 74 may be used as an additional input to the one-way function 72, and acts as a key. Encoding function 72 may be associated with database 20 so as to be accessible by authorized users and/or authorized workstations. The key—in the form of salt 74—may, for example, be a token code associated with one or more authorized workstations, database users, or the like. Salt 74 may be stored securely, in a location which may be logically and physically separate from database 20, such as a keystore. Accordingly, salt 74 may provide security. Other suitable encoding functions will be apparent to those skilled in the art. As noted, suitable encoding functions will be deterministic, non-colliding one-way functions. If the encoding function is a publicly-known function like the SHA-1 function, security may be provided by the use of a secret key, such as a salt. Alternatively, the encoding function may be secret, in which case security may be achieved by restricting access to the encoding function itself. In such cases, a salt or similar secret key may be used for additional security, or it may be omitted.

The ENC_ID values can thus be used with the LINK_KEY values to identify correspondence between a row of table 68 and a row of table 70. An authorized user, having access to table 68, one-way function 72, and, if used, salt 74 could easily determine the corresponding row of table 70 for any given row of table 68. In order to do so, an authorized user may select the desired row from table 68, load the LINK_KEY value associated with the row, load the one-way function 72, if applicable, load the salt, obtain the corresponding ENC_ID value, and select the row of table 70 with that value.

On the other hand, if an interloper were to gain access to either or both of tables 68 and/or 70, the interloper would not be able to easily re-associate the data in the two tables. Dividing the contents of input data set 24 in this manner obfuscates the relationship between corresponding rows of tables 68, 70 in that such correspondence cannot be identified without access to the encoding function 72 and, if used, the salt 74. Moreover, as encoding function 72 is a one-way function, ENC_ID values from table 70 cannot be used to obtain the corresponding LINK_KEY values of table 68, even with access to the encoding function. Thus, re-association of rows can only be done starting from rows of table 68.

In some embodiments, the LINK_KEY field in table 68 may be omitted. In such embodiments, values of ENC_ID may be generated using a universally unique identifier (UUID) value associated with the corresponding filtered image. UUID values may be calculated, as a function of the filtered image. For example, the UUID for an image may be a hashed set of bytes from the image. UUID values may be stored as metadata in the filtered image file, or may be determined on-demand by application software 38 whenever required, either for writing an ENC_ID value, or for retrieving a row of extract table 70. Other suitable methods for generating a UUID for a specific image file will be apparent to those skilled in the art. Since UUID values may be derived from the filtered images themselves, it may not be necessary to store the UUIDs in filtered table 68 or otherwise in association with filtered images. Instead, UUID's may be calculated when storing or retrieving rows of extract table 72.

Figure 8:
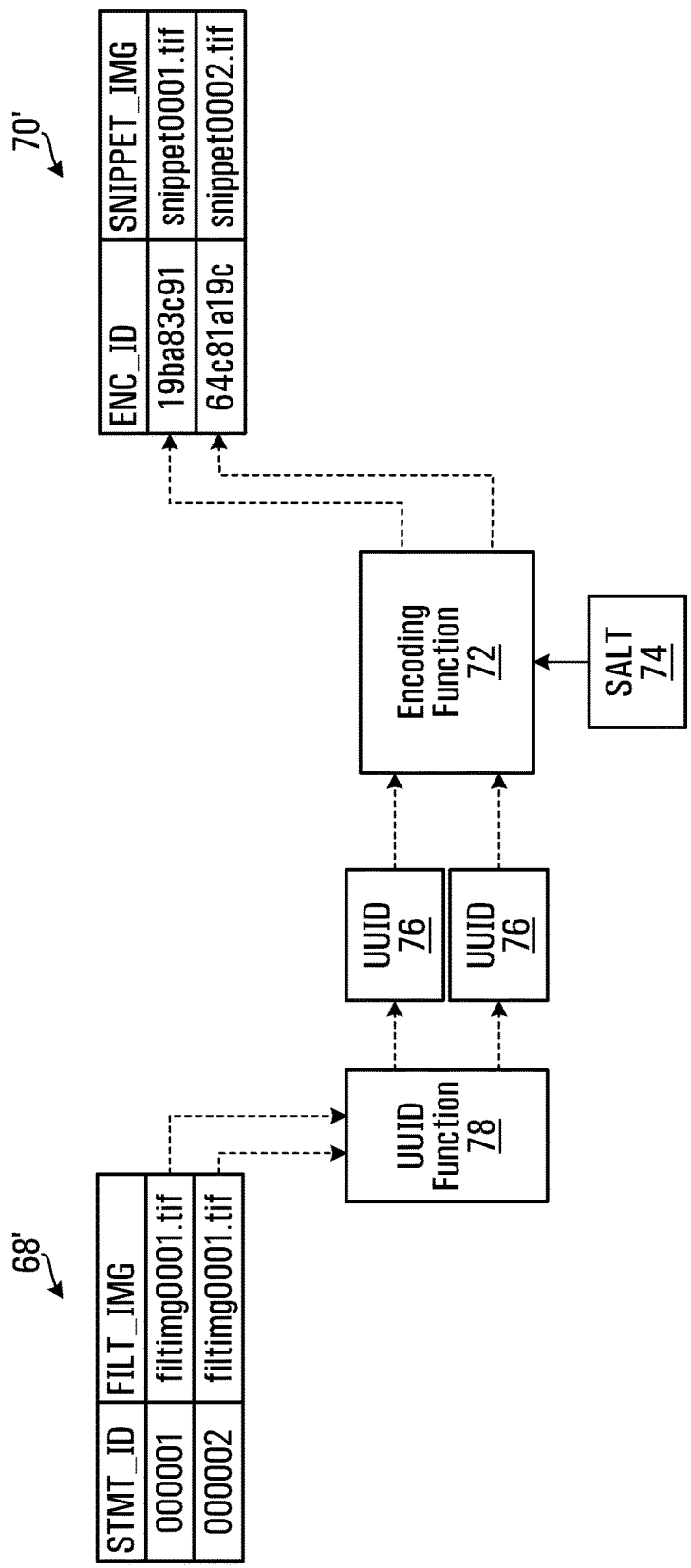
FIG. 8 is a schematic diagram illustrating database tables stored in the database at the database server of FIG. 1.

FIG. 8 depicts tables 68', 70' in which the ENC_ID field of table 70' is determined based on a UUID as described above. Tables 68', 70' contain filtered images and image snippets, respectively. When input statement images 42 are divided for storage in tables 68', 70', a UUID-generation function 78 is used to generate a UUID 76 from data in each filtered image 60 stored in table 68'. The generated UUID is in turn input to one-way function 72 to generate a corresponding ENC_ID for storage in table 70'. As will be more fully described below, when an authorized user wishes to retrieve and combine a filtered image from table 68' and the corresponding image snippet from table 70', data management software 38 retrieves the UUID function 78, generates the UUID for the filtered image, and then uses one-way function 72 to identify and retrieve the image snippet from table 70'.

Figure 9:
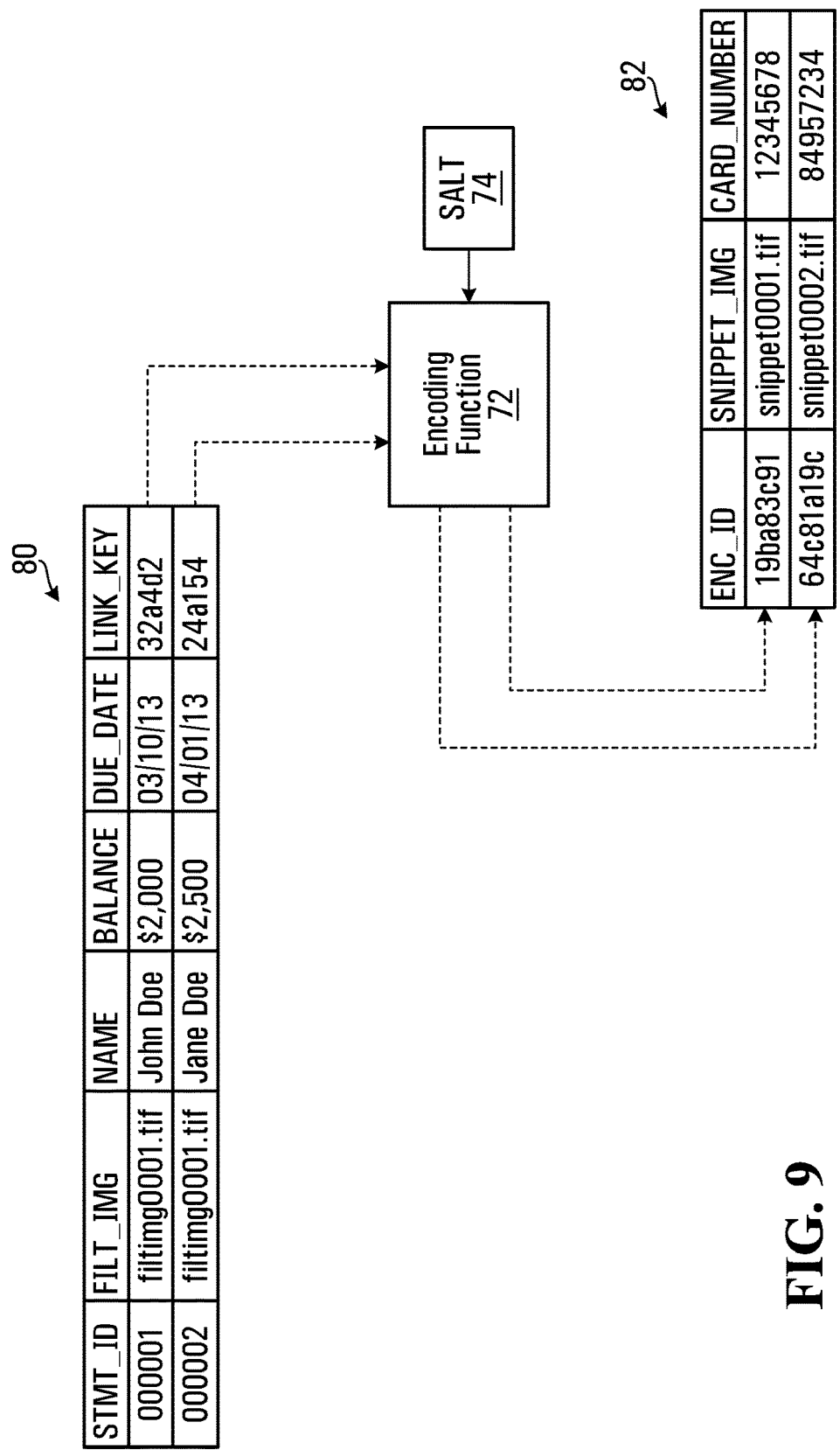
FIG. 9 is a schematic diagram illustrating database tables stored in the database at the database server of FIG. 1.

As noted above, in some embodiments, input data set 24 may include data associated with images 42. The associated data may be, for example, field-delimited data, with values belonging to a number of fields of tables in database 20. For example, the associated data may contain values for populating STMT_ID, ORIG_IMG fields, and for populating fields containing customer names, card numbers, balances and due dates. When the input data set 24 includes associated data in addition to statement images 42, the associated data are divided between two separate tables of database 20 as depicted in FIG. 9 in a manner that corresponds with the splitting of images 42.

Specifically, statement images 42 are split into filtered images and image snippets as described above. Table 80 contains filtered images in the FILT_IMG field, and table 82 contains image snippets in the SNIPPET_IMG field. The associated data is similarly divided. Table 80 includes fields containing customer names, balances and due dates. Table 82, includes a field containing credit card numbers.

Associated data values that are input along with images 42 are written to tables 80 and 82 based on the field to which each value belongs. Statement IDs, original image identifiers, customer names, balances and due dates are written to table 80. Credit card numbers are written to table 82. Thus, the associated data is divided between the tables in much the same way as the input images are split and stored in the tables. Table 82 contains credit card values, along with image snippets which contain credit card numbers. Table 80 contains the rest of the associated data, along with the filtered images. Each row of table 80 corresponds to a row of table 82, in that the pair of corresponding rows together contain all of the data in an input statement image 42 and its associated data.

A LINK_KEY field is created in table 80, containing a unique value associated with each row of the table, as described above. An ENC_ID field is created in table 82 and populated for each row by applying encoding function 72 to the LINK_KEY field of the corresponding row of table 80. Salt 74 may optionally be used as an additional input to encoding function 72.

Conveniently, dividing the contents of input data set 24 in this manner may enable data to be safely stored unencrypted. The maintainer of database 20 may protect against unauthorized access to pairs of statements or names and the associated credit card numbers by obfuscating the relationships between those data. Thus, processing which requires only one of the two partial images may be done very easily. Of course, as will be appreciated, if additional security is desired, some or all of the contents of database 20 may be encrypted in addition to relationships being obfuscated as described above.

Figure 10:
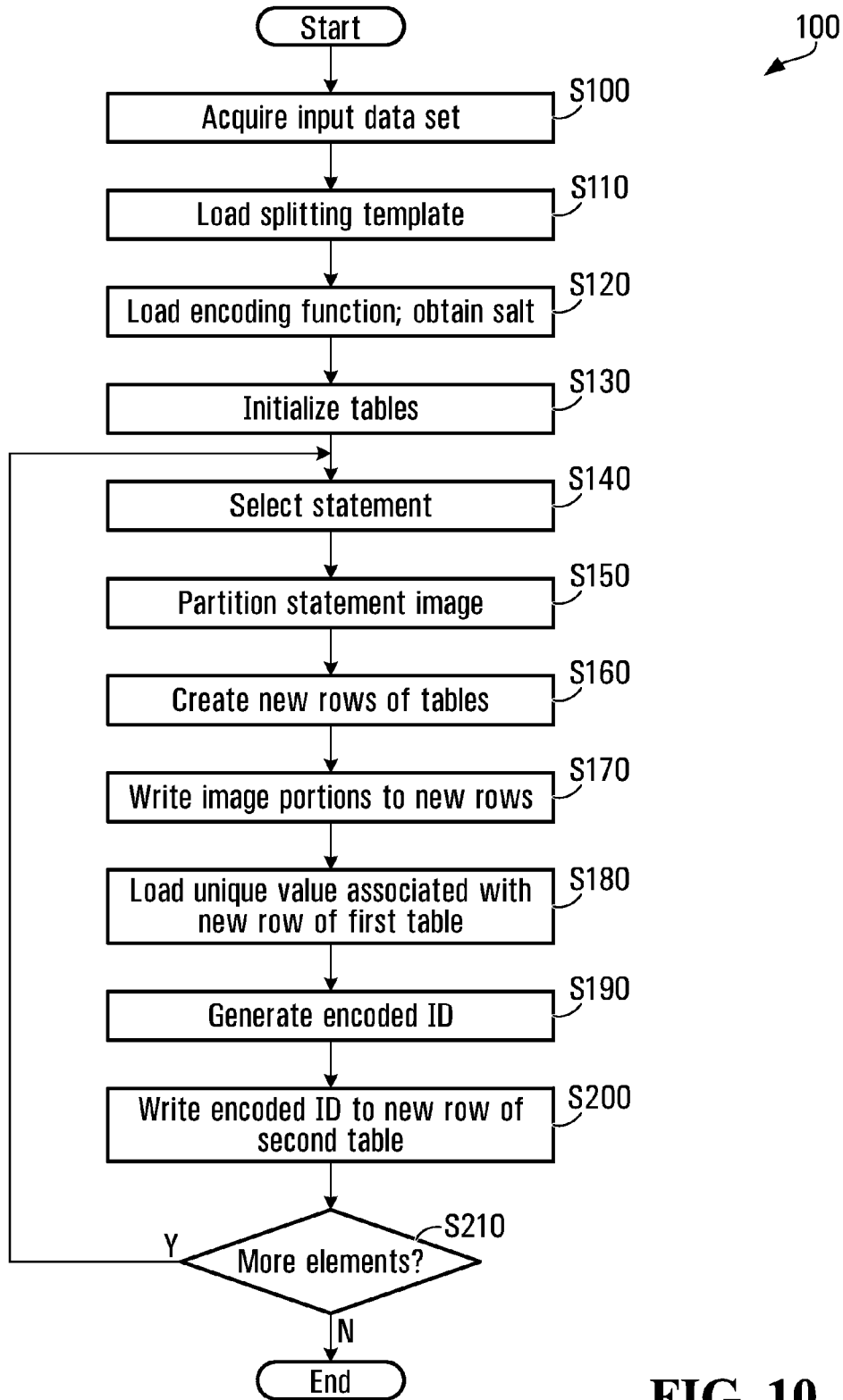
FIG. 10 is a flow chart illustrating an exemplary method of storing data in a database at the database server of FIG. 1.

FIG. 10 depicts a process 100 executed by server 10 under control of application software 38 to store data of an input data set 24 as depicted in FIGS. 6-9.

In block S100, acquisition module 38a of application software 38 running on server 10 (FIGS. 2-3) acquires the data set 24 to be stored. The data set may be directly loaded onto server 10 from a removable computer-readable medium such as a CD, DVD, flash drive or the like, or it may be transmitted to server 10 from another computer over a network connection. The data set 24 includes one or more statement images 42 and may further include meta-data. As noted above, meta-data may be contained in the image files themselves, or may be a separate data construct delimited so as to be capable of translation as a table like table 54 (FIG. 5B). Data set 24 may, for example contain a batch of statement images 42 from a particular financial institution, a predetermined standard format. The source of data set 24 and the format of statement images 42 contained in the data set may be identified by metadata provided with the data set.

In block S110, the splitting module 38b of application software 38 determines the format of statement images 42 and loads one or more templates for partitioning the images. The templates may be stored on server 10 and define regions of image statements 42 to be copied as snippets 62 and to be rendered unreadable in filtered images 60. If data set 24 includes meta-data in addition to images, splitting module 38b also loads a template to define how fields of the input table should be split between the filtered table 68 and extract table 70.

In block S120, encoding function 72 associated with database 20 is retrieved by encoding module 38d and loaded into memory. The one-way function will be used to generate encoded ID values as described above. Encoding module also obtains salt 74. Salt 74 may, for example, be obtained by prompting a user to enter a token code. Alternatively, salt 74 may be a token code associated with a specific machine or a value stored in a secure location such as a keystore or certificate store, or a value generated from a file stored in such a location. In block S130, filtered table 68 and extract table 70 are initialized, if they do not already exist. If table 70 does not have a field for the encoded ID valve, such a field is created.

In block S140, the application software 38 selects the first element of the input data set. An element of the data set corresponds to a statement image 42 and, if applicable, meta-data associated with that image. In block S150, splitting module 38*b* forms a filtered image 60 and an image snippet 62 from the statement image 42 based on the loaded template and saved in image repositories associated with database 20. In block S160, storage module 38*c* creates a new row in filtered table 68 and in extract table 70. In block S170, the storage module writes the created filtered image 60 to the filtered table and the created image snippet 62 to the extract table. Meta-data included with image statement 42 is likewise split between the filtered table and the extract table. A LINK_KEY value is then assigned to the row of filtered table 68.

In block S180, the encoding module 38*d* loads the LINK_KEY value into memory. As discussed above, the LINK_KEY value is a unique value associated with the selected row of the filtered table. Alternatively, a UUID derived from the filtered image may serve as a unique value associated with the selected row.

In block S190, encoding function 72 is applied to the LINK_KEY value to generate a unique encoded ID for the corresponding row of the extract table 70. Salt 74 may optionally be used as an additional input to encoding function 72. The encoded ID value is written to the ENC_ID field of the corresponding row of extract table 70 in block S200.

Once data is written to the selected row of the extract table, application software 38 determines In block S210 if there are additional data elements in the acquired data set (e.g., if there are additional statement images 42). If there are no further elements to be stored, the storage process terminates. If there are further elements, the process returns to block S140 and selects the next element of the acquired data set.

Figure 11:
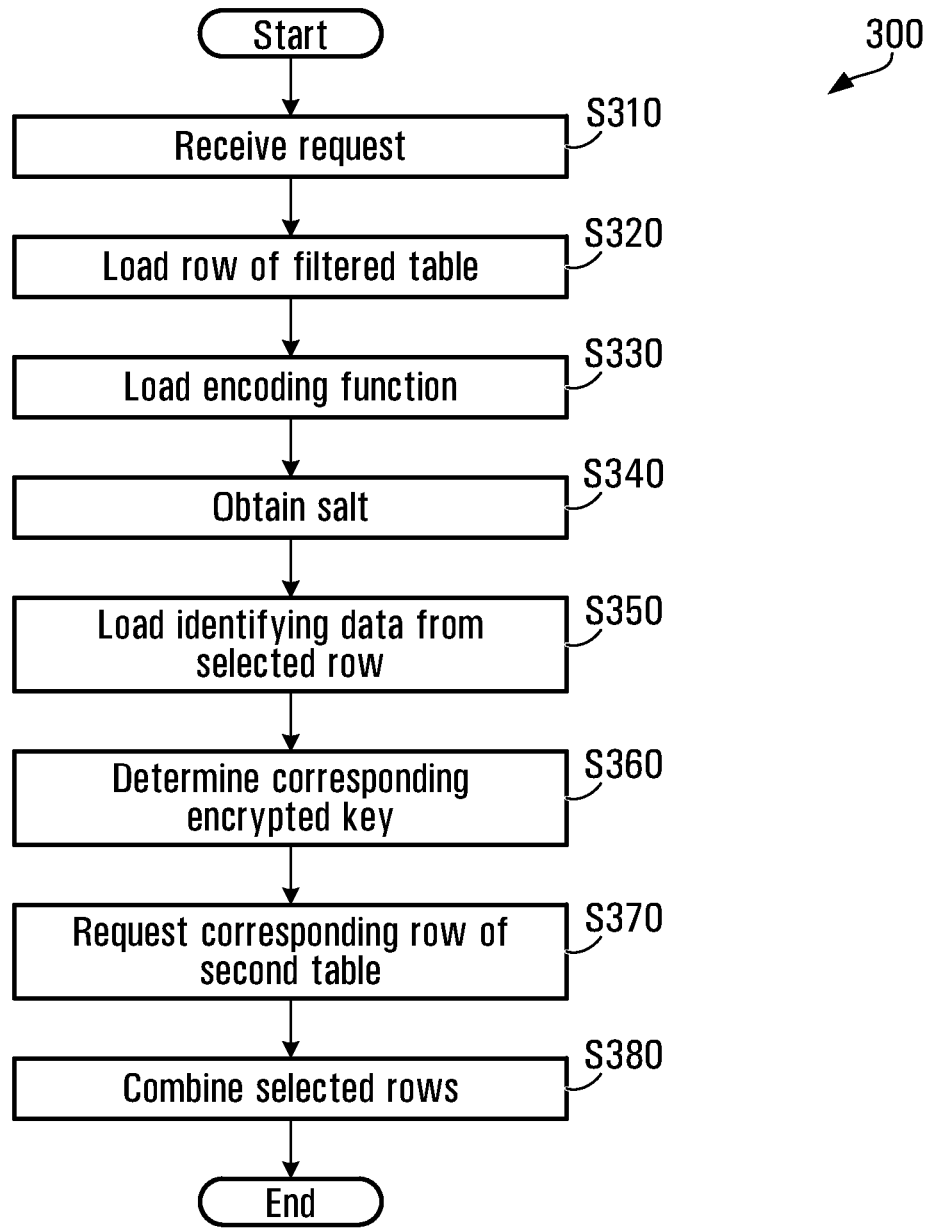
FIG. 11 is a flow chart illustrating an exemplary method of retrieving data from a database at the database server of FIG. 1.

Turning now to FIG. 11, a process 300 is depicted for retrieving data from database 20 and associating corresponding rows of tables 68, 70. The depicted blocks of the process are executed by application software 38 in response to a request from a client computer 14, 16 received by way of network 12.

In block S310, a user of client computer 14, 16 enters a request for data from database 20. The request is sent to server 10 by way of network 12. The request may identify, for example, a statement image required by the user of the client computer.

In block S320, retrieval module 38*e* at server 10 queries database 20 for the record of the filtered table containing the filtered portion of the desired statement image. The relevant row is returned and loaded into memory. In block S330, retrieval module 38*e* retrieves encoding function 72 from database 20 and loads it into memory.

In block S340, retrieval module 38*e* obtains salt 74 from the client computer. Salt 74 may, for example, be entered by a user at the client computer and may be a secret token code issued to the user. The salt 74 may be requested by retrieval module 38*e* from the client computer in response to the request received at block S310, or it may be automatically obtained by software at the client computer and provided with the request.

In block S350, retrieval module 38*e* loads unique identifying data associated with the selected row of filtered table 68 from the LINK_KEY field of that row.

With the unique identifying data and one-way function 72 and salt 74 loaded, in block S360, retrieval module 38*e* applies one-way function 72 to the unique identifying data and salt 74, to determine the ENC_ID to the loaded LINK_KEY value. In block S370, the corresponding row of table 70 is then requested from application software system 38 using the ENC_ID. Specifically, retrieval module 38*e* queries database 20 for entries of table 70 with the determined ENC_ID. In block S380, the corresponding row is then returned and loaded into memory. In block S380, the returned row is combined with the selected row of table 68 and the filtered image combined with the image snippet to re-construct the requested statement image 42. The reconstructed statement image is then sent to the client computer at block S390.

To retrieve and combine data from tables 68', 70', at block S350, as table 68' lacks a LINK_KEY field, the retrieval module retrieves and loads into memory the UUID function 78. The UUID function is then used with the filtered image from the selected row of table 68' to generate the UUID for that image. The resulting UUID is then used with the encoding function 72 at block S360.

Though process 300 is a process for retrieving a single statement image, skilled persons will appreciate that the process could be modified to perform a bulk retrieval of statement images. In such a modified process, the client computer would request a range of statement images to be retrieved. Retrieval module 38*e* would retrieve the relevant rows of filtered table 68 and, one-by-one, identify and retrieve the corresponding rows of extract table 20, and re-construct each statement image in the requested set. Once re-assembled, the set of statement images would be returned to the client computer.

In the above-described embodiments, input data set 24 includes statement images 42. However, in other embodiments, the input data set may take the form of an existing database table. In such embodiments, the fields of the input database table may be divided between first and second tables of database 20. For example, if an input table includes fields containing customer names, credit card numbers and other statement data, the customer names and other statement data may be stored in a first table, while the credit card numbers may be stored in a second table. A unique value may be associated with each row of the first table, and an encoding function may be used substantially as described above to generate an encoded ID value for each row of the second table from the unique value associated with the corresponding row of the second table.

As described above, a data set 24 is partitioned into one filtered table 68 and one snippet table 70. However, in other embodiments, data set 24 may be stored in multiple corresponding sets, sets of filtered tables and snippet tables. For example, some elements of a data set may be partitioned and stored in a first filtered table and a corresponding first snippet table. Other elements of the data set may be partitioned in the same manner and stored in a second filtered table and corresponding second snippet table. In some embodiments, different one-way functions or salts may be used for each filtered table and corresponding snippet table.

In the foregoing description, filtered images and image snippets are described as stored in database tables. However, in other embodiments, filtered images and image snippets may be stored in repositories which are not part of the tables of database 20. In such embodiments, tables of database 20 may hold identifiers of filtered image or image snippet files, rather than the images themselves.

Of course, the above described embodiments are intended to be illustrative only and in no way limiting. The described embodiments of carrying out the invention are susceptible to many modifications of form, arrangement of parts, details and order of operation. For example, software (or components thereof) described at server 10 may be hosted at several devices Software implemented in the modules described above could be implemented using more or fewer modules or submodules. The invention, rather, is intended to encompass all such modification within its scope, as defined by the claims.

What is claimed:

1. A method of obfuscating a relationship between data in database tables, said method comprising:
    dividing an input data set between first and second tables of a database, wherein said input data set is split into a first portion stored in rows of said first table and a second portion stored in rows of said second table, and wherein each row of said first table corresponds to a row of said second table, and wherein a universally unique identifier is associated with each row of said first table;
    applying a one-way function to the universally unique identifier associated with each row of said first table to calculate a unique encoded identifier associated with each row of said first table, wherein said one-way function calculates said unique encoded identifier in part based on a key code and wherein said first table and said second table do not contain said key code; and
    creating a key field in each of said rows of said second table storing the unique encoded identifier associated with the corresponding row of said first table to establish a one-way relationship between each row of said second table and the corresponding row of said first table,
    wherein each of said rows of said second table does not contain the universally unique identifier associated with the corresponding row of the first table,
    wherein each of said rows of said first table does not contain the unique encoded identifier associated with that row, and
    wherein each of said rows of said second table is uniquely identifiable within said second table for combining with a corresponding row of said first table by applying the one-way function to the universally unique identifier associated with the corresponding row of said first table to generate the unique encoded identifier stored in said second table,
    wherein said input data set comprises a plurality of images, and wherein said dividing comprises, for each one of said plurality of images:
        creating an image snippet comprising a copy of a first region of said one of said images,
        creating a filtered image comprising a copy of said one of said images, wherein said first region is rendered unreadable,
        storing said filtered image in said first table, and
        storing said image snippet and storing the unique encoded identifier of said image snippet in said second table.

2. The method of claim 1, wherein said input data set comprises an input database table comprising a plurality of fields, and wherein said dividing comprises dividing said fields between said first and second tables.

3. The method of claim 1, wherein further comprising retrieving said key code from a database, and wherein said key code is used as an input to said one-way function.

4. The method of claim 1, wherein said one-way function is a deterministic, non-colliding function.

5. The method of claim 4, wherein said one-way function is a hash function.

6. The method of claim 1, wherein data contained in said first and second tables is stored unencrypted.

7. A method of retrieving data stored in database tables, said method comprising:
    retrieving a first database table from a data store, each row in said first database table having an associated universally unique identifier;
    selecting a selected row of said first database table;
    determining a unique encoded identifier corresponding to said selected row by applying a one-way function to the universally unique identifier associated with the selected row, wherein said one-way function calculates the unique encoded identifier in part based on a key code and wherein said first table and a second database table do not contain said key code, wherein the selected row does not contain the unique encoded identifier, and wherein the unique encoded identifier uniquely identifies a corresponding row of the second database table for combining with the selected row;
    retrieving the corresponding row of the second database table based on the unique encoded identifier, wherein the corresponding row contains the unique encoded identifier and does not contain the unique value associated with the selected row of said first table, said first and second tables storing data from a data set split into a first portion stored in rows of said first table and a second portion stored in rows of said second table, wherein each row of said first table corresponds to a row of said second table, and wherein a one-way relationship exists between each row of said second table and the corresponding row of said first table; and
    combining data from said selected row of said first table with data from said corresponding row of said second table,
    wherein said first and second table comprises a plurality of images, and wherein said combining comprises, for each one of said plurality of images:
        retrieving, from said first table, a filtered image comprising a copy of said one of said images associated with the universally unique identifier, wherein a first region is rendered unreadable,
        retrieving, from said second table, based on the unique encoded identifier, an image snippet comprising a copy of said first region of said one of said images,
        combining said image snippet and said filtered image to form an image, and
        providing said image to a computing device.

8. The method of claim 7, wherein the universally unique identifier associated with each row of said first table comprises a UUID of an image identified in that row of said first table.

9. The method of claim 7, further comprising retrieving said key code from a database, and wherein said key code is used as an input to said one-way function.

10. The method of claim 7, wherein said one-way function is a deterministic, non-colliding function.

11. The method of claim 10, wherein said one-way function is a hash function.

12. A non-transitory computer-readable medium containing instructions which, when executed by a processor of a computing device, cause the computing device to:
divide an input data set comprising a plurality of images between first and second tables of a database, wherein each row in said first database table has an associated universally unique identifier, by, for each one said images:
creating an image snippet comprising a copy of a first region of said one of said images,
creating a filtered image comprising a copy of said one of said images, wherein said first region is rendered unreadable,
storing said filtered image in a row of said first table,
storing said image snippet in a row of said second table, and
wherein said instructions which, when executed by a processor of a computing device, further cause the computing device to:
apply a one-way function to the universally unique identifier of each row of said first table to calculate a unique encoded identifier associated with each row of said first table, wherein said one-way function calculates the unique encoded identifier in part based on a key code and wherein said first table and said second table do not contain said key code; and
create a key field in each of said rows of said second table storing the unique encoded identifier associated with the corresponding row of said first table to establish a one-way relationship between each row of said second table and the corresponding row of said first table,
wherein each of said rows of said second table does not contain the universally unique identifier associated with the corresponding row of the first table, wherein each of said rows of said first table does not contain the unique encoded identifier associated with that row, and wherein each of said rows of said second table is uniquely identifiable within said second table for combining with a corresponding row of said first table by applying the one-way function to the universally unique identifier of the corresponding row of said first table to generate the unique encoded identifier stored in said second table.

13. A non-transitory computer-readable medium containing instructions which, when executed by a processor of a computing device, cause the computing device to:
retrieve a first database table from a data store, each row in said first database table having an associated universally unique identifier;
select a selected row of said first database table;
determine a unique encoded identifier corresponding to said selected row by applying a one-way function to the universally unique identifier associated with the selected row, wherein said one-way function calculates the unique encoded identifier in part based on a key code and wherein said first database table and a second database table do not contain said key code, wherein the selected row does not contain the unique encoded identifier, and wherein the unique encoded identifier uniquely identifies a corresponding row of said second database table for combining with the selected row, wherein said first and second database table comprises a plurality of images;
retrieve the corresponding row of the second database table based on said unique encoded identifier, wherein said corresponding row contains said unique encoded identifier and does not contain the unique value associated with the selected row of said first table, said first and second tables storing data from a data set split into a first portion stored in rows of said first table and a second portion stored in rows of said second table, wherein each row of said first table corresponds to a row of said second table, and wherein a one-way relationship exists between each row of said second table and the corresponding row of said first table;
combine data from the selected row of said first database table with data from the corresponding row of said second database table, by, for each one of said plurality of images:
retrieving, from said first table, a filtered image comprising a copy of said one of said images associated with the universally unique identifier, wherein a first region is rendered unreadable,
retrieving, from said second table, based on the unique encoded identifier, an image snippet comprising a copy of said first region of said one of said images,
combining said image snippet and said filtered image to form an image; and
providing said image to a computing device.

14. A computing device for storing information in a database, said computing device comprising:
at least one processor;
an input/output device in communication with said at least one processor;
memory in communication with said at least one processor;
software code stored in said memory, which, when executed by said at least one processor, causes said computing device to:
read an input data set from said input/output device;
divide said input data set between first and second tables of a database, wherein said input data set is split into a first portion stored in rows of said first table and a second portion stored in rows of said second table, and wherein each row of said first table corresponds to a row of said second table, and wherein a universally unique identifier is associated with each row of said first table;
apply a one-way function to the universally unique identifier associated with each row of said first table to calculate a unique encoded identifier associated with each row of said first table, wherein said one-way function calculates the unique encoded identifier in part based on a key code and wherein said first table and said second table do not contain said key code; and
create a key field in each of the rows of said second table storing the unique encoded identifier associated with the corresponding row of said first table to establish a one-way relationship between each row of said second table and the corresponding row of said first table,
wherein each of the rows of said second table does not contain the universally unique identifier associated with the corresponding row of the first table,
wherein each of the rows of said first table does not contain the unique encoded identifier associated with that row, and
wherein each of the rows of said second table is uniquely identifiable within said second table for combining with a corresponding row of said first table, by applying said one-way function to the universally unique identifier associated with the corresponding row of said first table to generate said unique encoded identifier stored in said second table, wherein said input data set comprises a plurality of images, and wherein said dividing comprises, for each one of said plurality of images:

creating an image snippet comprising a copy of a first region of said one of said images, creating a filtered image comprising a copy of said one of said images, wherein said first region is rendered unreadable, storing said filtered image in said first table, and storing said image snippet and storing the unique encoded identifier of said image snippet in said second table.

15. A computing device for storing information in a database, said computing device comprising:

at least one processor;

an input/output device in communication with said at least one processor;

memory in communication with said at least one processor;

software code stored in said memory, which, when executed by said at least one processor, causes said computing device to:

retrieve a first database table from a data store using said input/output device, each row in said first database table having an associated universally unique identifier;

select a selected row of said first database table;

apply a one-way function to the universally unique identifier associated with the selected row to determine a unique encoded identifier corresponding to the selected row, wherein said one-way function calculates the unique encoded identifier in part based on a key code and wherein said first table and a second database table do not contain said key code, wherein the selected row does not contain the unique encoded identifier, and wherein the unique encoded identifier uniquely identifies a corresponding row of the second database table for combining with the selected row;

retrieve the corresponding row of said second database table based on said unique encoded identifier, wherein the corresponding row contains the unique encoded identifier and does not contain the universally unique identifier associated with the selected row of said first table, said first and second tables storing data from a data set split into a first portion stored in rows of said first table and a second portion stored in rows of said second table, wherein each row of said first table corresponds to a row of said second table, and wherein a one-way relationship exists between each row of said second table and the corresponding row of said first table; and combine data from the selected row of said first database table with data from the corresponding row of said second database table, wherein said first and second table comprises a plurality of images, and wherein said combining comprises, for each one of said plurality of images:

retrieving, from said first table, a filtered image comprising a copy of said one of said images associated with the universally unique identifier, wherein a first region is rendered unreadable, retrieving, from said second table, based on the unique encoded identifier, an image snippet comprising a copy of said first region of said one of said images, combining said image snippet and said filtered image to form an image; and providing said image to a computing device.

* * * * *